United States Patent [19]
Rutley

[11] 3,756,613
[45] Sept. 4, 1973

[54] TRACTION APPARATUS FOR VEHICLE TIRES

[76] Inventor: Russell Rutley, 1630 Croation Road, Campbell River, British Columbia, Canada

[22] Filed: Apr. 24, 1972

[21] Appl. No.: 246,777

[52] U.S. Cl. .................. 280/8, 152/225, 152/182
[51] Int. Cl. ............................................. B60c 27/00
[58] Field of Search .................. 280/13, 14, 8; 152/182, 225

[56] References Cited
UNITED STATES PATENTS 1,286,330  12/1918  Jantzen .................................. 280/8
2,764,212  9/1956  Double .............................. 152/182

Primary Examiner—James B. Marbert
Attorney—Kellard A. Carter

[57] ABSTRACT

Apparatus for flattening the bearing surface of a resilient tire on a vehicle wheel to achieve improved performance in deep powder snow. A runner is attached to the frame of the vehicle to shape the bearing surface. A flexible band may be used with the runner to provide a still larger flattened bearing surface. Wear members are provided on the runner, and on the flexible band if it is used, to reduce wear as the moving parts slide on the fixed parts.

14 Claims, 10 Drawing Figures

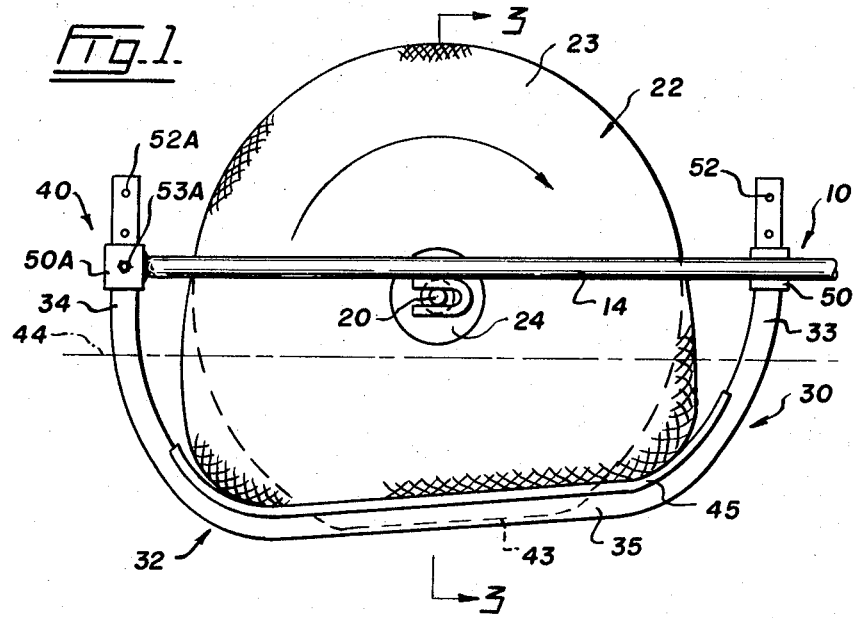
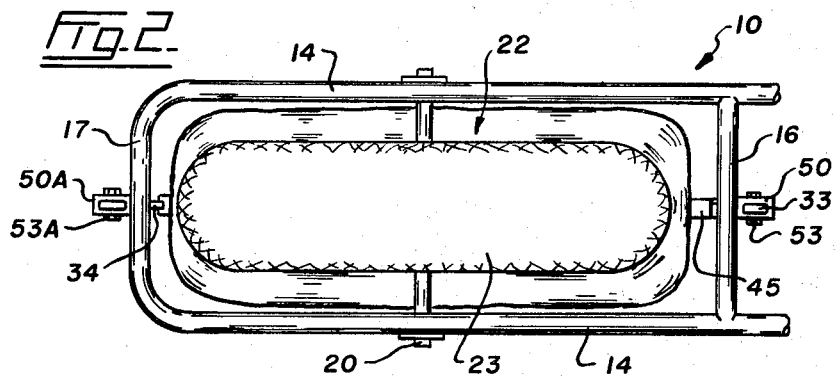
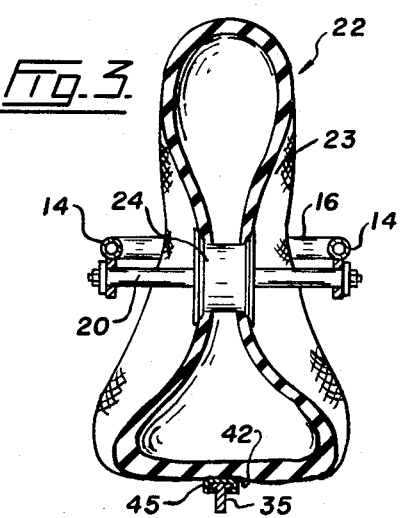
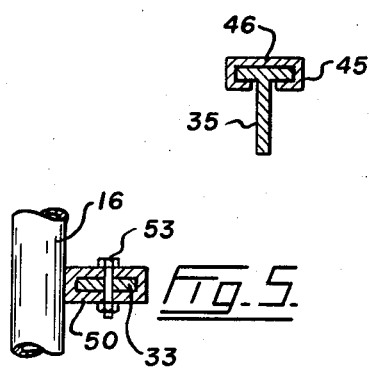

PATENTED SEP 4 1973 3,756,613
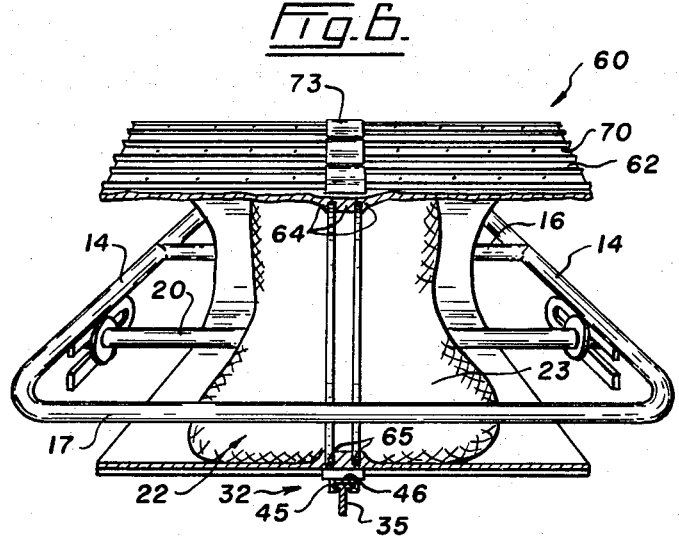
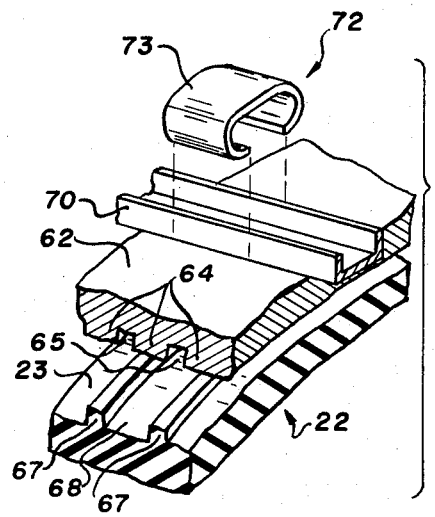
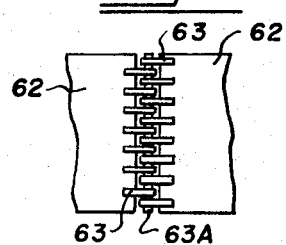
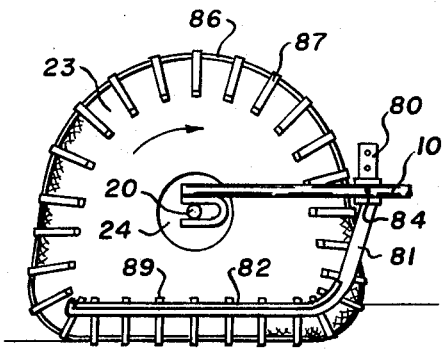
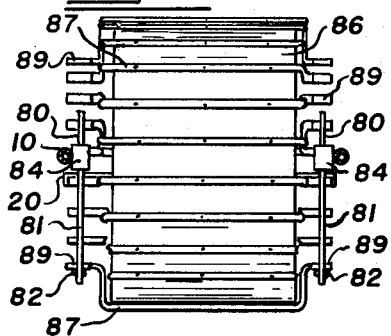

TRACTION APPARATUS FOR VEHICLE TIRES

My invention relates to means for changing the shape of the bearing surface of a resilient tire, and more particularily for flattening the bearing surface of a low pressure, pneumatic tire operatively mounted on the wheel of a vehicle, so as to improve tire performance in soft surface conditions such as deep mud, snow, swamp, or loose sand, etc.

The extensive use of numerous types of wheeled vehicles in such conditions over the years, has made it quite clear that the performance of wheels in general, and even wheels equipped with the very effective low pressure pneumatic tires, leaves much to be desired. The main reason for their poor performance under the conditions mentioned is the generally curved bearing area which is presented by the tire to the surface over which the wheel is rolling. The wheel tends to sink deeply into the soft material and lose traction, whereupon the vehicle becomes bogged down.

Experience with flat tracks on vehicles has shown that a flat bearing surface is superior in soft surface conditions due to the flattened bearing area which is presented. However, the disadvantages of using tracks on a vehicle have lead to attempts to improve the performance of a wheel in those conditions by such means as attachments, changes in design, etc. One attachment comprises a wide, non-flexible track which is secured around the circumference of the wheel. Such an arrangement provides a wide and transversely straight bearing surface but the surface still remains curved in a front to rear or lengthwise direction. An example of this is shown by U.S. Pat. No. 3,435,873 issued to Jacob J. Weier on April 1, 1969. In another U.S. Pat. No. 2,668,736 issued to John Morris Poche on Feb. 9, 1964, we see an attempt to achieve at least intermittent flattening of the bearing surface of a non-resilient wheel.

I propose to take advantage of the recent development of improved pneumatic tires, generally known as "low pressure" tires. These tires have a wider tread, some of them have a smaller diameter hub, and they can operate at a lower pressure than the previous conventional designs. Another feature is that some tires are constructed of rubber only without the usual cord strengthened walls and/or are permanently bonded to the wheel hub to ensure against air leak during very low pressure operation. These wide-tread tires can operate at a pressure as low as one pound per square inch or less in some installations, and therefore their bearing surface tends to straighten or flatten out more when under load, especially on firmer surfaces. As a result, there is less tendency to sink even into relatively soft surfaces, due to the ability of the wide-tread tires to flatten or conform to the shape of the surface on which they are operating. Unfortunately, the area of flatness of the bearing surface of these tires when normally inflated depends on, among other things, the flatness or firmness of the surface on which they are operating, the bearing surface of the tires being flattest on firm surfaces and remaining more or less curved especially in a lengthwise direction on surfaces which are quite soft. (Note: The tire may be designed with a tread which is straight in a crosswise direction.) As a result, where the greatest overall flattening of the bearing surface is most desirable, namely, during operation in very soft surfaces such as deep powder snow, the shape of the bearing surface remains more or less unchanged, this to some extent being due to centrifugal force as the wheel revolves. During such operation, the performance of a wide, low-pressure tire even those with a straight tread, shows little improvement over the conventional high-pressure, pneumatic tire with a wide, non-flexible, track-like face attached.

My invention is a considerable improvement over previous attempts to extend the range of usefulness of a tire in very soft surface conditions by merely straightening and/or extending the tire tread in a crosswise direction to increase the bearing surface. I have discovered means whereby a low-pressure tire operatively mounted on a vehicle wheel can present a large, flattened bearing surface to the surface over which it is operating at all times. This requires straightening the bearing surface of the tire in a lengthwise direction as well as in a crosswise direction and, in order to accomplish this, a metal forming strap or runner is installed on the frame of a motor vehicle to extend under the tread of the tire and alter its shape in the aforesaid manner so that it does not sink so deeply into snow or the like, thereby improving the performance of the tire in such conditions. The shape of the runner is such that it can readily slide through snow or mud etc. and it is easily bolted or otherwise attached to the frame of the vehicle so that it can be put on and taken off when required. One embodiment of the invention employs a still wider tire tread, or traction area, in the form of a flexible band which is fitted around the circumference of the wheel. This band is made flexible to conform to the distortion which results when the runner is installed, but it is also stiffened so as to remain reasonably straight in a crosswise direction at all times. By altering the shape of the bearing surface of the tire by straightening it in a lengthwise as well as in a crosswise direction, the desired flattened surface can be obtained, and without undue friction between the runner and the tread especially in deep snow or the like. The wheel acts like a short length of flat track in soft surface conditions, the amount of sinking being greatly reduced and vehicle mobility being improved substantially. Provision is made to reduce wear between the tread and the runner by means of low friction surfaces.

In drawings which illustrate preferred embodiments of the invention;

FIG. 1 is a side view of a vehicle wheel fitted with a large, low pressure, pneumatic tire and showing in position of use, one embodiment of the apparatus in accordance with the present invention, FIG. 2 is a plan view of the apparatus, FIG. 3 is a vertical section taken on the line 3—3 of FIG. 1, FIG. 4 is a detailed section showing a runner of the apparatus fitted with a wear strip, FIG. 5 is a horizontal section showing securing means for the runner, FIG. 6 is a perspective view, part broken away and in section, showing a flexible band of another embodiment of the invention, FIG. 7 is an exploded perspective view showing portions of the flexible band, FIG. 8 is a fragmentary plan showing a joint for the flexible band, FIG. 9 is a side elevation of still another embodiment of the invention, and FIG. 10 is an end elevation of this embodiment.

Referring to the drawings, the numeral 10 indicates a frame of a vehicle which is commonly referred to as a trail bike, viz., a lightweight motorcycle designed to travel over rugged terrain. This particular motorcycle has been selected as an example of the type of vehicle which might utilize the present invention but it will be understood there are a number of three-wheeled and four-wheeled, mainly so called "off road" vehicles, on which the device might be used as well.

The frame 10 includes a rearwheel-mounting portion (FIGS. 1, 2 and 3) formed of parallel side bars 14 which are cross connected by front and rear bars 16 and 17. Removably secured to the bars 16 and 17 is a transversely extending axle 20 which journals a wheel 22, the wheel being driven by the usual chain and sprocket drive (not shown).

The wheel 22 includes a low pressure, pneumatic tire 23 which is suitably installed on a hub 24 so as to contain the air with which it is inflated. I prefer to use a large carcass, thin side walled, tubeless rubber tire 23 because of its great flexibility.

When the trail bike is required to travel through deep snow for example, the rear or driving wheel is fitted with the present apparatus which is generally indicated at 30. A suitable ski (not shown) could be attached to the front wheel if desired. As illustrated in FIGS. 1 to 5 of the drawings, the apparatus 30 comprises shaping means for the tire tread which takes the form of a runner 32 which is a thin, flat, substantially U-shaped bar providing front and rear end portions 33 and 34 as well as a cam track 35. The steel runner 32 is secured to the frame 10 by means generally indicated at 40, the securing means supporting said runner approximately in the plane of rotation of the wheel 22 and so that the cam track 35 extends beneath the center of tread portion 42 of the tire 23 to be slidably engaged thereby. The spacing between the track 35 and the axle 20 of the wheel is such that the lower part of the flexible tire is compressed or distorted as shown in FIGS. 1 and 3. In FIG. 1, the dotted line 43 represents the shape the tread of the tire would assume under normal load if the present apparatus was not fitted and the tire was resting on a flat surface. When the apparatus 30 is used and the trail bike is travelling in deep snow which is represented by chain dotted line 44 in FIG. 1, it will be seen that the bearing surface of the tire is straightened in a front to rear or lengthwise direction. FIG. 3 shows how the bearing surface of the tire is also straightened or flattened in a crosswise direction.

Thus, the runner 32 serves to shape the bearing surface of this particular tire into a considerably flattened configuration so that it can move through fairly deep snow with less tendency to become deeply embedded and lose traction that would otherwise be the case. The wheel 22, of course, rotates on the runner 32 and the snow-embedded portions of the runner actually slide through the snow without creating any unacceptable amount of drag.

In order to reduce tread wear, the runner 32 is fitted with a cover strip 45. As shown best in FIG. 4, the cam track 35 of the runner is provided with a top flange 46 and the strip 45 is suitably secured to this flange. The cover strip 45 preferably is made of some low friction, plastic material which will resist abrasion from the tire tread while protecting the tread portion 42 from the metal runner 32 as the wheel revolves. If prolonged use in snow becomes necessary, a low friction spray c uld be applied to the tire face or tread.

The securing means 40 comprises a sleeve 50 which is welded or otherwise fastened near the center of the crossbar 16 of the vehicle frame. The front end portion 33 of the runner slidably extends through the sleeve 50 and said portion is provided with a number of spaced holes 52 to receive a locking bolt 53 carried by the sleeve. Rear end portion 34 of the runner is attached to the rear crossbar 34 in exactly the same manner with corresponding parts of this half of the securing means 40 being designated could same reference numerals and the letter A where they appear in the drawing. Thus, the runner 32 is adjustably mounted on the frame 10 by the securing means 40 and can be raised or lowered through a short distance at least. This arrangement enables the bearing surface of the tire to be altered or flattened as required to suit particular snow or other conditions.

It will be noticed in FIG. 1 that the cam track 35 of the runner is inclined upwardly from the rear end portion 34 to the front end portion 33. By sloping the track 35 upwardly in the direction of travel of the vehicle in this manner, the wheel 22 has a greater tendency to plane, or ride upward, at higher speeds than would otherwise be the case and there is less tendency for the vehicle to dig in and bog down.

FIGS. 6, 7 and 8 show another embodiment of the invention in which the apparatus 30 includes traction means generally indicated at 60 and intended for attachment to the tire to strengthen it against folding over the runner 32 and to further increase the effective width of the tire. The traction means 60 comprises a flexible band 62 which preferably is of rubber-cord construction although metal or plastic might be used as long as a band made of plastic or metal was flexible enough to conform to the shape given to the tire by the runner. The band 62 can be endless or it can have opposite ends fitted with interlacing hinge members 63 (FIG. 8) to receive a pin 63A whereby the band can readily be fitted to the wheel 22 without the need to remove it from the frame. The inner surface of the band 62 is provided with transversely spaced ribs 64, see particularly FIG. 7, which extend around the circumference of said band at the center thereof to define annular grooves 65. The tread or face of the tire 23 has corresponding ribs 67 which enter the grooves 65 and these ribs provide a groove 68 to receive the central rib 64. This interlocking rib and groove arrangement maintains alignment between the wheel 22 and the band 62 and provide guide means which prevent the band from moving transversely across and becoming disaligned on the tire 23.

Since the band 62 is flexible, it must be stiffened in a crosswise direction and this is done preferably by riveting steel cleats 70 to its periphery as shown in FIGS. 6 and 7. These channel-like steel cleats 70 have an interrupted wear strip 72 which may be formed of steel or plastic clips 73, see particularly FIG. 7, which are installed one on each of the steel cleats. As the wheel rotates, the strip 72 slides along the cover strip 45 on the flange 46 to assist in reducing wear between the fixed and moving parts of the apparatus.

It has been shown by way of example only how this invention could be used on the driving wheel of a suitably designed trail bike but many vehicles having a suitably designed frame and wheels could use the invention to advantage in the conditions previously mentioned. While it might be more practical to use the invention only on the driving wheel, or wheels, of a motor vehicle, it can be used on the undriven wheels provided the weight of the vehicle and surface conditions are such that the wheels will revolve satisfactorily on a non-rotating runner 32. Furthermore, the apparatus 30 is not restricted to use only on wheels equipped with pneumatic tires as in this example of use of the present invention. a wheel with a tire of foam rubber or plastic, or in which the necessary resilience is provided by steel springs, with a suitable tread of rubber or other material, could be used. The main requirement is that the tire be sufficiently resilient and flexible as to have substantially the same characteristics of a pneumatic tire. Since a wheeled vehicle may be required to operate over surface conditions that vary all the way from hard pavement in summer, to deep powder snow in winter, no single type of wheel can cover such a range of conditions to best advantage. The runner 32 can be used by itself to provide a considerably flattened bearing surface which will get the vehicle through reasonable snow conditions. However, if deep, powder snow is encountered, the band 62 is used in addition to the runner 32. The runner 32 is installed to flatten the already broad bearing surface provided by the band 62 and this serves to prevent the wheel on which the apparatus is installed from sinking too deeply into the snow.

In FIGS. 9 and 10 there is shown still another embodiment of the present invention in which the frame 10 is adapted to be fitted with a pair of runners 80 each having an end portion 81 and a cam track 82. The portions 81 are each detachably secured to the frame 10 by means 84 which is of the same construction as the previously described securing means 40. Thus, the tracks 82 can be raised or lowered as required and these tracks extend rearwardly from their securing means so as to be positioned one near each side wall of the tire 23.

For this embodiment, the wheel 22 is fitted with a flexible band 86 having circumferentially spaced traction cleats 87 extending transversely thereof. The opposite or free ends 89 of each cleat 87 are cranked as shown in FIG. 10 to extend over the cam tracks 82 and engage said tracks during part of the rotation of the wheel.

Thus, as the wheel fitted with this particular embodiment rotates in the direction indicated by the arrow in FIG. 9, the free ends 89 are swung progressively into sliding engagement with the cam tracks 82. The spacing of the tracks 82 relative to the axle 20 is such that the lower part of the tire tread is shaped into a flattened bearing surface.

From the foregoing, it will be apparent I have provided apparatus which is practical, inexpensive, and of simple and lightweight construction. The runner 72 is designed for quick application or removal, as are also the flexible bands 62 and 86, a feature desirable when operating over varying surface conditions. The runner 32 is adjustable so as to flatten the bearing surface of the tire tread to whatever extent is desired and so that said surface can be readily readjusted later to suit conditions.

I claim

1. Apparatus for flattening the bearing surface of a tire on the wheel of a vehicle comprising shaping means including a cam track, securing means for attaching the shaping means to a part of the vehicle with the cam track disposed below the axis of rotation of the wheel, and means on the tire engaging the cam track to compress said tire towards the axis of rotation of the wheel whereby to flatten the normal bearing surface of the tire.

2. Apparatus as claimed in claim 1, in which said means on the tire includes transverse members spaced about the circumference of said tire.

3. Apparatus as claimed in claim 2, in which said transverse members are carried by a flexible band secured to the face of the tire for rotation therewith.

4. Apparatus for flattening the bearing surface of a tire on the wheel of a vehicle having a frame comprising a runner having a cam track, securing means for attaching the runner to the vehicle frame with the cam track extending beneath the tire substantially in the plane of rotation of the wheel, said tire having a tread portion slidably engaging the runner whereby the tire is compressed towards the axis of rotation of the wheel and the normal bearing surface of said tire is flattened.

5. Apparatus as claimed in claim 4, and including a transversely extending cover strip mounted on the cam track in contact with the tread portion of the tire.

6. Apparatus as claimed in claim 4, in which said runner is inclined upwardly in the direction of travel of the vehicle.

7. Apparatus as claimed in claim 4, in which said securing means is adjustable whereby the area of the flattened bearing surface of the tire can be varied as required.

8. Apparatus for flattening the bearing surface of a tire on the wheel of a vehicle having a frame comprising a substantially U-shaped runner having end portions and a cam track, securing means for attaching the end portions to the vehicle frame with the cam track extending beneath the tire substantially in the plane of rotation of the wheel, a transversely extending cover strip mounted on the cam track and engaged by a tread portion of the tire, said cam track compressing the tire towards the axis of rotation of the wheel whereby to flatten the normal bearing surface of said tire.

9. Apparatus as claimed in claim 4, and including traction means mountable on the tire and cooperating with the runner to increase the effective width of said tire.

10. Apparatus as claimed in claim 9, in which said traction means comprises a flexible band, and transverse traction cleats carried by the flexible band to stiffen said band in a crosswise direction.

11. Apparatus as claimed in claim 10, and including guide means for maintaining alignment between the tire and the flexible band.

12. Apparatus as claimed in claim 11, in which said guide means comprises cooperating ribs and groove on the abutting faces of the tire and the flexible band.

13. Apparatus as claimed in claim 10, and including a second cover strip on traction cleats to slidably engage the first mentioned cover strip.

14. Apparatus for flattening the bearing surface of a tire on the wheel of a vehicle having a frame comprising a pair of runners each having an end portion and a cam track, securing means for attaching the end portions to the frame with the cam tracks disposed one near each side wall of the tire, a flexible band mounted on the tire to increase the effective width of said tire, transversely extending traction cleats circumferentially spaced around the flexible band, said traction cleats having free ends extending beyond the side edges of the flexible band and engaging the cam tracks of the runners during part of the rotation of the wheel, said free ends and the cam track cooperating to compress the tire towards the axis of rotation of the wheel whereby to flatten the bearing surface provided by the flexible band on said tire.

* * * * *